United States Patent
Makino

(10) Patent No.: US 8,579,566 B2
(45) Date of Patent: Nov. 12, 2013

(54) BLIND FASTENER AND PRODUCTION METHOD THEREOF

(75) Inventor: Takanori Makino, Toyohashi (JP)

(73) Assignee: Newfrey LLC, Newark, DE (US)

(*) Notice: Subject to any disclaimer, the term of this patent is extended or adjusted under 35 U.S.C. 154(b) by 177 days.

(21) Appl. No.: 13/158,977

(22) Filed: Jun. 13, 2011

(65) Prior Publication Data

US 2011/0311334 A1 Dec. 22, 2011

(30) Foreign Application Priority Data

Jun. 17, 2010 (JP) ................................. 2010-138064

(51) Int. Cl.
*F16B 13/06* (2006.01)

(52) U.S. Cl.
USPC .............................................. 411/34; 148/907

(58) Field of Classification Search
USPC ............ 411/183, 34; 148/320, 319, 907, 225, 148/663
See application file for complete search history.

(56) References Cited

U.S. PATENT DOCUMENTS

| | | | | |
|---|---|---|---|---|
| 1,924,099 | A * | 8/1933 | Bain et al. | 148/596 |
| 3,461,771 | A | 8/1969 | Briles | |
| 5,181,886 | A * | 1/1993 | Van Allman et al. | 470/40 |
| 5,722,124 | A * | 3/1998 | Wisniewski | 24/295 |
| 5,860,866 | A * | 1/1999 | Van Allman et al. | 470/34 |
| 6,318,940 | B1 * | 11/2001 | Mitts | 411/188 |
| 6,413,326 | B1 | 7/2002 | Rallis | |
| 7,004,845 | B2 | 2/2006 | Brun | |
| 2003/0070736 | A1 | 4/2003 | Jackson | |
| 2006/0147296 | A1 | 7/2006 | Torizuka et al. | |

FOREIGN PATENT DOCUMENTS

| | | |
|---|---|---|
| EP | 0158305 A | 10/1985 |
| JP | 3072029 A | 3/1991 |
| JP | 2004-137560 A | 5/2004 |
| JP | 2004-286088 A | 10/2004 |
| JP | 2004-286217 A | 10/2004 |
| JP | 2004-362154 A | 12/2004 |
| KR | 19990056686 A | 7/1997 |

OTHER PUBLICATIONS

European Search Report dated Sep. 22, 2011.
Zhang Peng et al. "Preparation and microstructural characterization of hard bainite in surface layer of low-carbon alloy steel", ISSN: 1009-6264, CN, vol. 30, No. 4, Aug. 1, 2009, pp. 44-47.

* cited by examiner

*Primary Examiner* — Flemming Saether
(74) *Attorney, Agent, or Firm* — Michael P. Leary

(57) ABSTRACT

This invention relates to a blind fastener having a hollow sleeve with high surface hardness and sufficient elongation, and to a novel heat treatment method therefor. The method for the heat treatment of the blind fastener includes austempering. The austempering includes a step in which a hollow sleeve of cold-rolled low carbon steel with a carbon percentage of 0.08 to 0.13% is heated and maintained from 800° C. to 950° C. during carburization, and a subsequent step in which isothermal maintenance is performed from 320° C. to 500° C. The resulting carbon percentage (CP) value is from 0.3 to 0.5%. Even in the case of a low carbon steel blind fastener, the austempering can harden the surface of the sleeve and soften the inner portion other than the surface for suitable elongation in order to provide a blind fastener having a sleeve with high surface hardness and sufficient elongation.

2 Claims, 4 Drawing Sheets

| Measurement Location | Sample 1 Cooling: 300°C |  |
|---|---|---|
|  | Knurling Cross-Section |  |
|  | Bottom Portion | Inner Portion |
| Hv | 363 | 222.5 |
| Structure |  |  |

| Measurement Location | Sample 2 Cooling: 350°C |  |
|---|---|---|
|  | Knurling Cross-Section |  |
|  | Bottom Portion | Inner Portion |
| Hv | 287.5 | 204 |
| Structure |  |  |

| Measurement Location | Sample 3 Cooling: 400°C |  |
|---|---|---|
|  | Knurling Cross-Section |  |
|  | Bottom Portion | Inner Portion |
| Hv | 257 | 207 |
| Structure |  |  |

BLIND FASTENER AND PRODUCTION METHOD THEREOF

CROSS-REFERENCE TO RELATED APPLICATIONS

This application claims priority from Japanese Patent Application No. 2010-138064, filed on Jun. 17, 2010, the disclosure of which is incorporated herein by reference.

BACKGROUND OF THE INVENTION

The present invention relates to a blind fastener such as a blind nut or a blind rivet, and to a heat treatment method therefor. More specifically, the present invention relates to the sleeve of a blind fastener and a heat treatment method therefor able to harden the surface and increase the elongation of the hollow sleeve of a blind fastener.

A blind fastener such as a blind nut or a blind rivet has a hollow sleeve with a flange on one end. The sleeve is inserted into a mounting hole in a fastened component such as a panel or another part, and the hollow portion of the sleeve is partially expanded in the outward direction radially so as to interpose the fastened component such as a panel or another part between the expanded portion of the sleeve and the flange of the sleeve. In this way, the fastened component can be securely fastened. When one of the fastened components is a panel and the other fastened component is a part, the part is secured to the panel using a blind fastener. The use of a blind fastener is advantageous because it can be fastened using a blind operation from only one side of the fastened component, even when the fastened component has a wide area such as an automotive panel. The characteristics required of a blind fastener include a hard sleeve in order to obtain high fastening strength, and sufficient elongation when the sleeve is expanded. If the sleeve of the blind fastener does not have sufficient hardness and sufficient elongation, it cannot obtain high fastening strength and may crack when expanded and deformed. In either case, adequate fastening cannot be performed.

PRIOR ART PATENT DOCUMENTS

Patent Document 1: Japanese Published Unexamined Patent Application No. 2004-286088
Patent Document 2: Japanese Published Unexamined Patent Application No. 2004-137560
Patent Document 3: Japanese Published Unexamined Patent Application No. 2004-286217
Patent Document 4: Japanese Published Unexamined Patent Application No. 4-362154

In a blind fastener such as a blind nut or a blind rivet, as described in Patent Document 1, knurled grooves or protrusions extending in the axial direction of the sleeve are often formed in a plurality of rows circumferentially on the outer peripheral surface of the sleeve in order to bite into the fastened component and prevent rotation (turning) with respect to the fastened component. A blind fastener with a knurled sleeve can undergo nitriding treatment as one form of surface hardening treatment in order to improve biting into the fastened component. An example of a nitriding treatment is described in Patent Document 2. In the nitriding treatment of the prior art, the original object is to improve wear resistance. The treated surface is hardened, but elongation cannot be sufficiently increased. When a sleeve subjected to the nitriding treatment of the prior art is deformed during expansion, cracking tends to occur.

Patent Document 3 describes a clinch nut with a soft, plastic recessed area obtained using annealing followed by cold rolling. Patent Document 3 does not describe a fastener with high surface hardness and sufficient elongation.

Patent Document 4 describes a mechanical part in which boron steel containing 0.40 to 0.65% carbon and 0.005 to 0.003% boron is austempered. Bainite is a suitable structure for elongation, but blind fasteners such as blind nuts and blind rivets are made of low carbon steel containing about 0.1% carbon (C). Even when austempering has been performed, it is insufficient from the standpoint of hardness and the desired surface hardness cannot be reached.

FIG. 6 are isothermal transformation diagrams (TTT diagrams) for the heat treatment of carbon steel in which (a) denotes the austempering curve and (b) denotes the normal quench tempering curve. In the austempering process shown in (a), supercooled austenite is transformed into bainite via isothermal maintenance. From a comparison of (a) and (b), it is clear that resiliency and pliability similar to normal quench tempered steel is obtained from austempering simply by quenching the steel in a salt bath, and that tempering is not required. Thus, the heat treatment is simpler and takes less time than quench tempering. However, as mentioned above, a low carbon steel blind fastener cannot obtain sufficient hardness using austempering.

Therefore, an object of the present invention is to provide a blind fastener having a sleeve with high surface hardness and sufficient elongation, and a heat treatment method therefor.

SUMMARY OF THE INVENTION

In order to achieve this object in the present invention, the carbon concentration at the surface is increased by performing carburization during the sustained heating of the blind fastener in the austempering process. The blind fastener is then quenched and isothermal conditions are maintained to harden the surface with a high carbon concentration and maintain good elongation conditions in the interior.

One aspect of the present invention is a blind fastener having a hollow sleeve, wherein the hollow sleeve of cold-rolled low carbon steel is made with austempering.

The carbon percentage of the low carbon steel can be from 0.08 to 0.13%. The austempering can be performed by heating and maintaining the temperature from 800° C. to 950° C. during carburization, and then performing isothermal maintenance from 320° C. to 500° C.

Even though the blind fastener is made of cold-rolled low carbon steel, the austempering and carburization can harden the surface of the sleeve and soften the inner portions other than the surface for suitable elongation.

Preferably, the heating and maintaining is performed from 860° C. to 890° C. Preferably, the isothermal maintenance is performed by immersion in salts.

The blind fastener can be a blind nut, wherein the blind nut comprises a hollow sleeve having a flange on one end, and a nut formed integrally on the other end of the sleeve, and wherein knurled grooves or protrusions extending in the axial direction of the sleeve are formed in a plurality of rows circumferentially on the outer peripheral surface of the sleeve.

The blind fastener can also be a blind rivet, wherein the blind rivet comprises a hollow sleeve having a flange on one end, and a mandrel extending through the sleeve, and wherein knurled grooves or protrusions extending in the axial direction of the sleeve are formed in a plurality of rows circumferentially on the outer peripheral surface of the sleeve.

Another aspect of the present invention is a method for heat treating the sleeve of a blind fastener having a hollow sleeve, wherein the method comprises a step in which a hollow sleeve of cold-rolled low carbon steel is heated and maintained from 800° C. to 950° C. during carburization, and a subsequent step in which isothermal maintenance is performed from 320° C. to 500° C.

The carbon percentage of the low carbon steel can be from 0.08 to 0.13%. Here, carburization can be performed in the heating and maintenance step of the austempering process. The carbon percentage (CP) value of the sleeve can be from 0.3 to 0.5% due to the carburization process. Preferably, the carbon percentage (CP) value of the sleeve is 0.4 due to the carburization process. Preferably, the heating and maintaining is performed from 860° C. to 890° C. Preferably, the isothermal maintenance is performed by immersion in salts.

In this method, the blind rivet can be cold-rolled using low carbon steel before austempering and carburization. Because the amount of carbon is increased by the carburization during the subsequent heating and maintenance step, the amount of carbon in the material does not have to be increased in order to increase the strength of the blind fastener, the blind fastener can be molded from a low strength steel blank, the life of the molds can be extended, and the molds themselves do not have to be as strong as they currently are.

In the present invention, even though the blind fastener is made of cold-rolled low carbon steel, the austempering and carburization can harden the surface of the sleeve and soften the inner portions for suitable elongation. Thus, a blind fastener can be provided having a sleeve with high surface hardness and sufficient elongation. As a result, the blind fastener is unlikely to buckle or crack, yet more readily bites into the matrix.

DETAILED DESCRIPTION OF THE INVENTION

Figure 1:
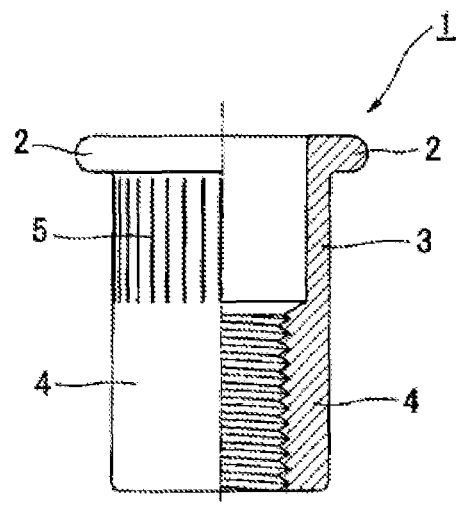
FIG. 1 is a front view showing a portion of the blind nut in cross-section.
Figure 2:
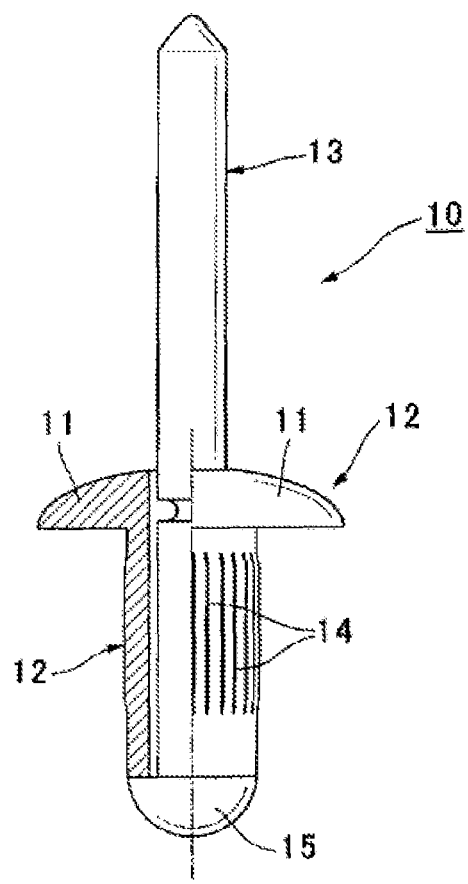
FIG. 2 is a front view showing a portion of the blind rivet in cross-section.

Blind fasteners that can be heat treated in the present invention include blind nuts and blind rivets. FIG. 1 shows a blind nut 1, and FIG. 2 shows a blind rivet 10. The blind nut 1 in FIG. 1 is a single component composed of a hollow sleeve 3 with a flange 2 on one end (the upper end), and a nut 4 formed integrally on the other end (lower end) of the sleeve 3. In the blind nut 1 shown in FIG. 1, knurled grooves 5 extending in the axial direction of the sleeve 3 are formed in a plurality of rows circumferentially on the outer peripheral surface of the sleeve 3. When the sleeve has knurled grooves, it has to be hardened because the knurled grooves reduce the overall strength of the sleeve. However, when the entire sleeve is hardened, it sometimes cracks due to the deformation during expansion. Even though the sleeve has knurled grooves, the heat treatment method of the present invention can harden the surface of the sleeve and soften the inner portions of the sleeve for suitable elongation. Thus, good fastening strength to the fastened component can be maintained while preventing cracking of the sleeve during expansion and deformation. Instead of knurled grooves 5, protrusions can be disposed on the outer peripheral surface of the sleeve 3.

The blind rivet 10 in FIG. 2 is composed of a hollow sleeve 12 with a flange 11 on one end (the upper end), and a mandrel 13 extending through the sleeve 12. The sleeve 12 and the mandrel 13 are separate components. A mandrel head 15 with a larger diameter than the other portions is formed in the mandrel 13, and is arranged near the other end (the lower end in FIG. 2) of the sleeve 12. The mandrel 13 extends through the sleeve 12 from the flange 11. Knurled grooves 14 extending in the axial direction of the sleeve 12 are formed in a plurality of rows circumferentially on the outer peripheral surface of the sleeve 12. Even though the blind rivet has a sleeve with knurled grooves, the heat treatment method of the present invention can harden the surface of the sleeve and soften the inner portions of the sleeve for suitable elongation as in the case of the blind nut. Thus, good fastening strength to the fastened component can be maintained while preventing cracking of the sleeve during expansion and deformation. Instead of knurled grooves 14, protrusions can be disposed on the outer peripheral surface of the sleeve 12.

The manufacturing method for the sleeve of a blind fastener according to the present invention will now be explained. The blind fastener has a sleeve. The sleeve is formed by cold rolling a low carbon steel blank. In order to keep the inner portion of the sleeve soft, the blank for the blind fastener is a low carbon steel with a carbon percentage (CP value) from 0.08 to 0.13% (SWCH: cold-rolled carbon steel). The sleeve is then austempered. The heat treatment method of the present invention using austempering comprises an initial step in which at least the sleeve is heated and maintained from 800° C. to 950° C. during carburization, and a subsequent step in which quenching and isothermal maintenance is performed from 320° C. to 500° C.

More specifically, the sleeve is heated inside a continuous furnace in gas from 1 to 30 minutes at a temperature from 800° C. to 950° C. The gas can be RX gas (composition: CO approx. 20%, $H_2$ approx. 40%, $N_2$ approx. 40%). Propane can be mixed with the RX gas. The carburizing can be performed in a batch furnace, followed by the austempering. In this step, the sleeve is carburized to obtain a carbon percentage (CP value) from 0.3 to 0.5%. The carburizing depth is approximately 0.025 mm.

Next, the sleeve is immersed in salts (dissolved salts) at a temperature from 320° C. to 500° C., quenched to this temperature, and maintained isothermally from 1 to 30 minutes. At this time, the supercooled austenite is believed to undergo the transformation to bainite. Afterwards, the sleeve is removed from the salts and allowed to cool. This heat treatment hardens the surface of the sleeve despite the presence of knurled grooves. For example, the Vickers hardness (Hv) approaches 300. Despite the presence of knurled grooves, the inner portion of the sleeve remains soft, for example, at an approximate hardness of Hv 200 (with a target a low as Hv 120). This can allow for elongation and prevent cracking when the sleeve is expanded and deformed.

Specific Examples

A blind nut with knurled grooves is available commercially from the present applicant. This blind nut is made of cold rolled, low carbon steel (material: SWCH10). This blind nut was heat treated using austempering and carburization. Sample 1, Sample 2 and Sample 3 were obtained by heat treating three samples for the same amount of time and at the same temperature in the heating and maintenance step for the austempering, but by changing the temperature in the isothermal maintenance step. The surface treatment was performed on Samples 1-3 using EP-Fe/Zn5/CM(III) trivalent chromate.

Figure 3:
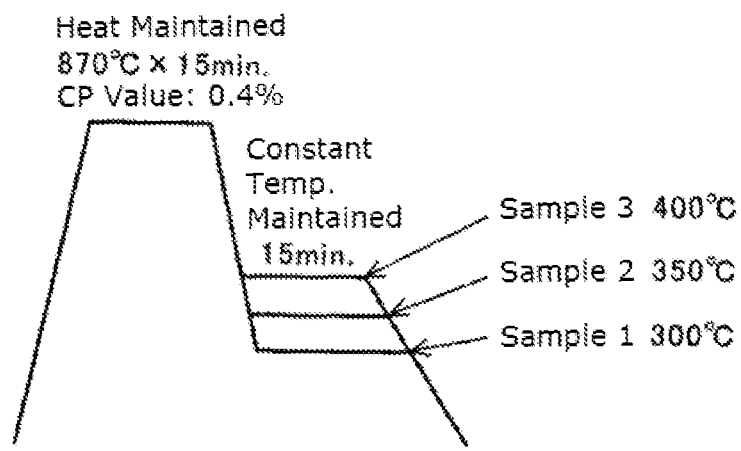
FIG. 3 is a graphic showing the thermal processing curve of the austempering in an embodiment of the present invention.

The heat treatment conditions for the austempering and carburization are shown in FIG. 3. In the case of Samples 1-3, the heating and maintenance step was performed by heating the samples for 15 minutes at 870° C. in RX gas, and performing carburization to obtain a CP value of 0.4%. Afterwards, the samples were quenched to the isothermal maintenance temperature and isothermal maintenance was performed. The isothermal maintenance step was performed at 300° C. for 15 minutes in the case of Sample 1, at 350° C. for 15 minutes in the case of Sample 2, and at 400° C. for 15 minutes in the case of Sample 3. After the isothermal maintenance step, Samples 1-3 were allowed to cool.

Figure 4:
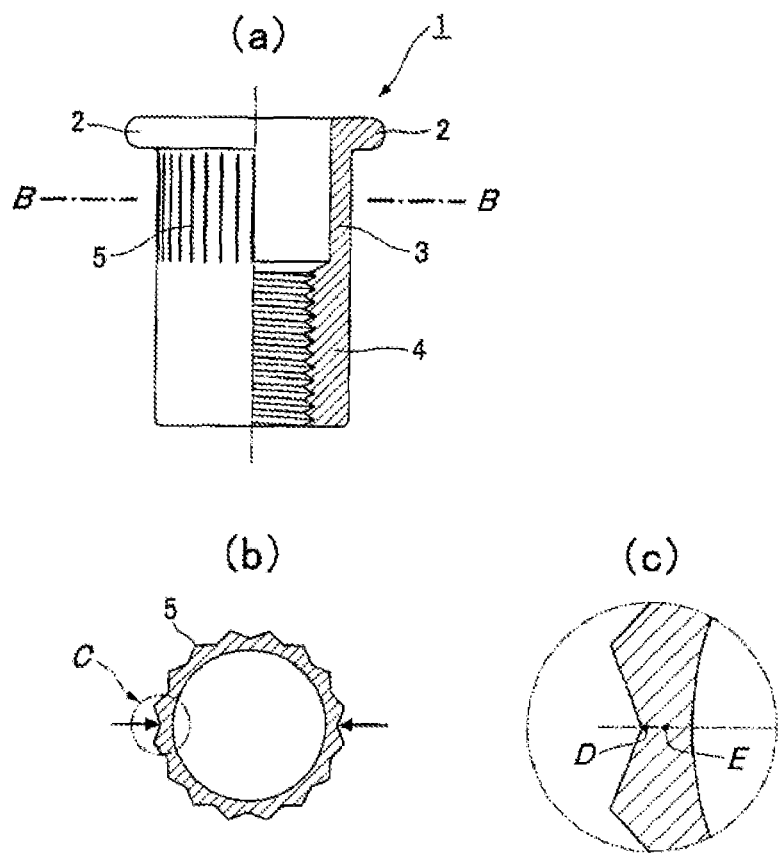
FIG. 4 is views showing the sample hardness measurement positions for a blind nut.

After performing austempering and carburization, the hardness of the heat-treated blind nuts in Samples 1-3 was measured. The locations at which the hardness of Samples 1-3 was measured are shown in FIG. 4. The sample of the blind nut shown in FIG. 4 (a) was sectioned along line B-B to obtain the cross-section shown in FIG. 4 (b). An enlarged view of the portion indicated by C in FIG. 4 (b) is shown in FIG. 4 (c). The position indicated by D in the knurling cross-section is the bottom section of the knurling. The hardness was measured towards the inside from the bottom portion (D) at 0.01 mm intervals. The inner portion (E) is located 0.25 mm towards the inside from the bottom portion (D).

Figure 5:
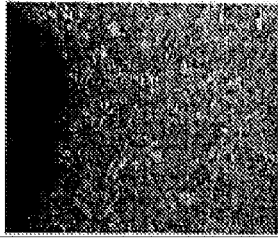
FIG. 5 is tables showing hardness measurement results and structure photographs of knurling cross-sections.
Figure 5:
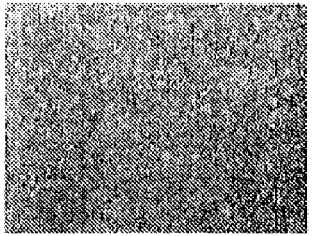
Figure 5:
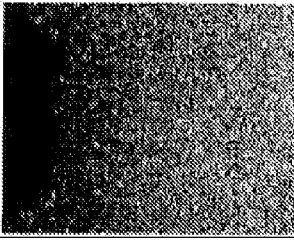
Figure 5:
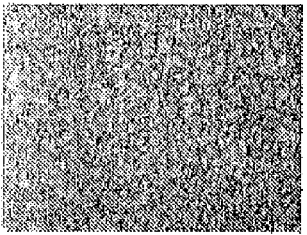
Figure 5:
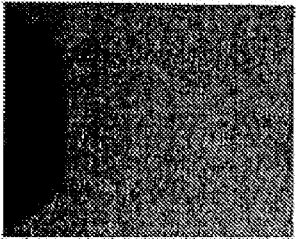
Figure 5:
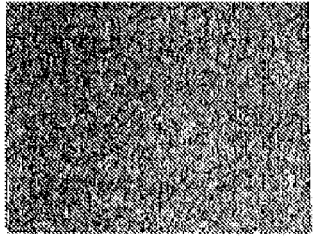
Figure 6:
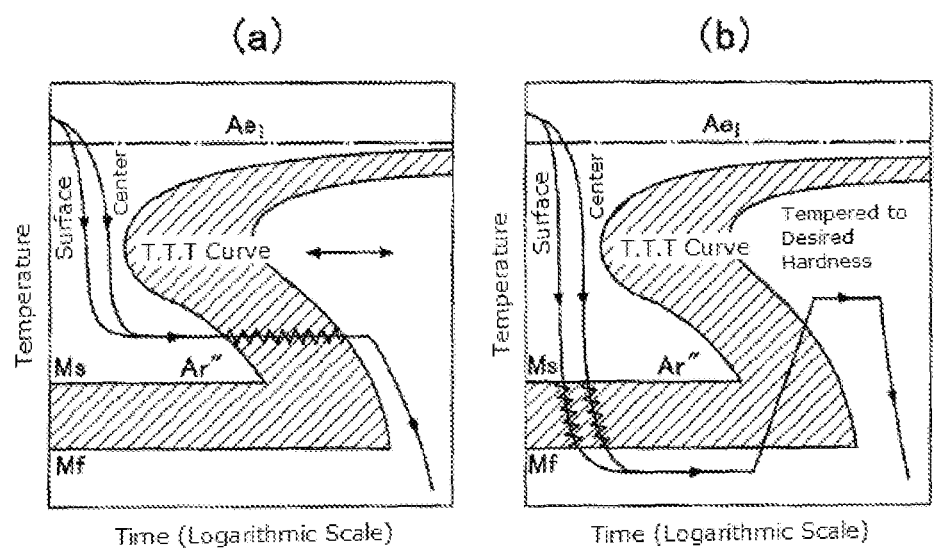
FIG. 6 Graphs of TTT curves for carbon steel in which (a) denotes the austempering curve and (b) denotes the normal quench tempering curve.

The hardness measurement results and structure photographs of Samples 1-3 are shown in FIG. 5. Also, a summary of the hardness measurement results are shown in Table 1.

TABLE 1

| | Knurling Cross-Section Hardness After Austempering | | |
|---|---|---|---|
| | Isothermal | Hardness Hv (25 g) Knurling Cross-Sections | |
| Samples | Maintenance (° C.) | Bottom Portion (D) | Inner Portion (E) |
| Sample 1 | 300 | 363 | 222.5 |
| Sample 2 | 350 | 287.5 | 204 |
| Sample 3 | 400 | 257 | 207 |

The hardness in the knurled bottom portion of the surface became harder as the isothermal maintenance temperature was lowered. The hardness of the inner portion was also softer than the surface. Sample 1, which had an isothermal maintenance temperature of 300° C., had a hard bottom portion (D). The hardness of the inner portion (E) was 222.5. Samples 2-3 were preferred at an approximate Hv of 200. From the structural photographs, Sample 1 and Sample 2 are believed to have a mixed ferrite/bainite structure, and Sample 3 is believed to have a completely bainite structure.

In the embodiments of the present invention, the surface of the sleeve was hardened and the inner portions softened for suitable elongation using austempering. As a result, a blind faster can be obtained with high surface hardness and suitable elongation.

What is claimed is:

1. A blind fastener, comprising:
a hollow sleeve,
the hollow sleeve being formed of cold-rolled low carbon steel and subsequently being made with austempering, wherein
the austempering includes carburization in a furnace in a gas containing a predetermined amount of carbon monoxide so that the steel has a carbon percentage of from 0.3 to 0.5%.

2. The blind fastener of claim 1, wherein the austempering is performed by heating and maintaining the temperature from 800° C. to 950° C. during carburization, and then performing isothermal maintenance from 320° C. to 500° C.

* * * * *